United States Patent
Frank et al.

(10) Patent No.: US 7,406,446 B2
(45) Date of Patent: Jul. 29, 2008

(54) SYSTEM AND METHOD FOR TRUSTWORTHY METERING AND DEACTIVATION

(75) Inventors: Alexander Frank, Bellevue, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 11/074,500

(22) Filed: Mar. 8, 2005

(65) Prior Publication Data

US 2006/0206718 A1 Sep. 14, 2006

(51) Int. Cl.
*H04K 1/00* (2006.01)
*H04L 9/00* (2006.01)
*G06F 1/00* (2006.01)
*H04N 7/167* (2006.01)

(52) U.S. Cl. .......................... 705/52; 726/27; 713/323; 380/201

(58) Field of Classification Search .................... 705/52
See application file for complete search history.

(56) References Cited

U.S. PATENT DOCUMENTS 5,355,161 A * 10/1994 Bird et al. .................... 725/22
5,768,382 A 6/1998 Schneier et al.
2002/0147782 A1* 10/2002 Dimitrova et al. ........... 709/207
2005/0033747 A1* 2/2005 Wittkotter .................... 707/10
2005/0050355 A1* 3/2005 Graunke ...................... 713/201
2005/0125673 A1* 6/2005 Cheng et al. ................. 713/182

OTHER PUBLICATIONS

Specification of U.S. Appl. No. 10/989,122, filed Nov. 15, 2004.
Specification of U.S. Appl. No. 11/006,837, filed Dec. 8, 2004.
International Search Report for PCT/US06/12811 mailed Sep. 25, 2007.
Written Opinion for PCT/US06/12811 mailed Sep. 25, 2007.

* cited by examiner

*Primary Examiner*—Christian LaForgia
(74) *Attorney, Agent, or Firm*—Marshall, Gerstein & Borun LLP

(57) ABSTRACT

A computer is adapted for use in different operating modes by configuring an output controller, such as a graphics processing unit, to screen output signals prior to presenting them to the output device. A secure environment in the output controller verifies a digital signature or a hash of the output signal to determine whether the output signal is compatible with the current mode of operation. Thus only authorized output signals are presented when the computer is operating in a limited function mode, such as when metered usage time is expired. The apparatus and method also disclose similar output signal screening for determining whether the computer should be returned from a standby, or no-metering, mode to an active, or metered mode.

2 Claims, 4 Drawing Sheets

SYSTEM AND METHOD FOR TRUSTWORTHY METERING AND DEACTIVATION

BACKGROUND

A pay-as-you-go or pay-per-use business model for the distribution of personal computers is built on the notion of collecting funds on an on-going basis in exchange for beneficial use of the computer or some component thereof. When the pay-per-use funding or pre-paid time period is about to expire, the user is given a chance to "recharge" the account to assure uninterrupted use of the computer. However, a situation arises when the funding or usage time period expires before the account is recharged. Completely disabling the computer may prevent the user from adding value and restoring operation. On the other hand, sanctions that allow the user limited use of the computer, in theory to allow recharging, may encourage non-payment when the limited use allows enough functionality to satisfy the user.

Additionally, when the system is deactivated, in addition to allowing reactivation it should also allow for maintenance, for example, defragmenting a disk drive, and troubleshooting, e.g. network subsystem. Therefore there is a need to block beneficial use of the computer after subscribed usage has expired, while allowing processes used for maintenance or reactivation of the computer when the subscription terms are satisfied.

SUMMARY

An output processing unit, such as a graphics processor or sound board, is configured with an internal capability for signal analysis beyond the normal output processing. The signal analysis processing capability is used for analysis of output data that are presented for output. Depending on the mode of operation of the computer, the output processing unit may determine if the output data is consistent with the current mode of operation. The secure processing capability discourages tampering that could defeat the analysis process as well as providing a scheme operator with a secure end point for updates associated with monitoring operations and sanctioning processes.

According to one aspect of the disclosure, a graphics processing unit (GPU) may be used to filter or analyze displayed graphics, such that only authorized graphic images associated with recharging or troubleshooting the computer are displayed. The display graphics may be digitally signed or may have hash codes that allow the GPU to identify authorized graphic images for use when operating under sanctions.

According to another aspect of the disclosure, a graphics or sound processing unit may be used to help determine when the computer is engaged in beneficial use and therefore should be metered or is essentially idle and should not be metered. By distinguishing between output data associated with screen savers, maintenance utilities, or other idle processes and user-associated processes, such as word processors or MP3 players, the output processing unit may supplement existing metering processes supported in the computer.

DETAILED DESCRIPTION OF VARIOUS EMBODIMENTS

Figure 1:
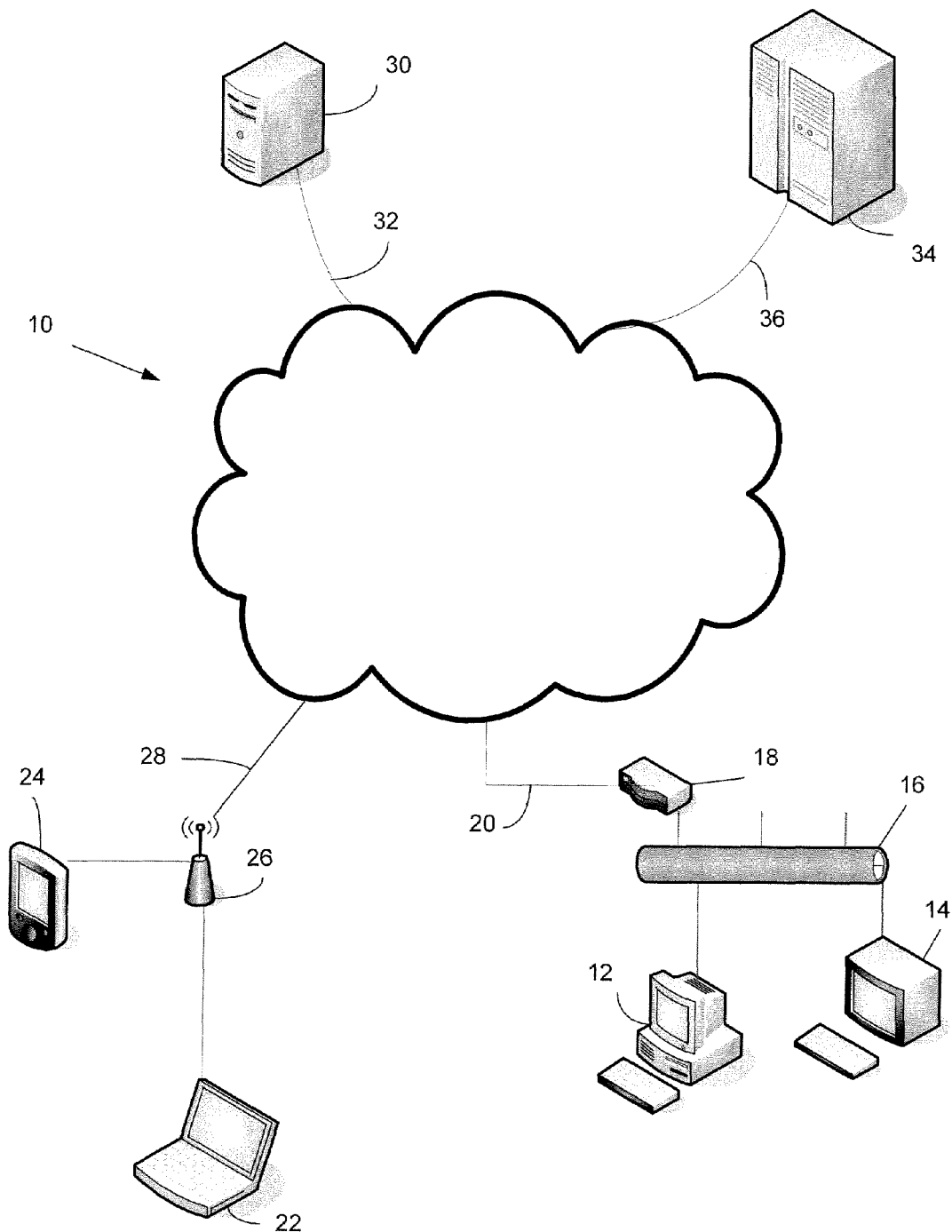
FIG. 1 is a simplified and representative block diagram of a computer network.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior art high-value computers, personal digital assistants, organizers and the like may not be suitable for use in a pre-pay or pay-for-use business model without additional security. As discussed above, such equipment may need additional functionality and underlying security services to meet the requirements of the pay-per-use or pay-as-you-go business models. For example, a personal computer can be disconnected from a provided Internet service and still be useful for word processing, spreadsheets, etc. In the case where a service provider, for example an Internet service provider or other business entity, underwrites the cost of the personal computer with the expectation of future fees, this "untethered value" creates an opportunity for fraudulent applications and theft. Similarly, when a pay-per-use or pay-as-you-go computer is not authorized for full operation it is desirable to support enough functionality to accomplish the authorization process without providing enough functionality to tempt a user to use the computer in the sanctioned mode.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
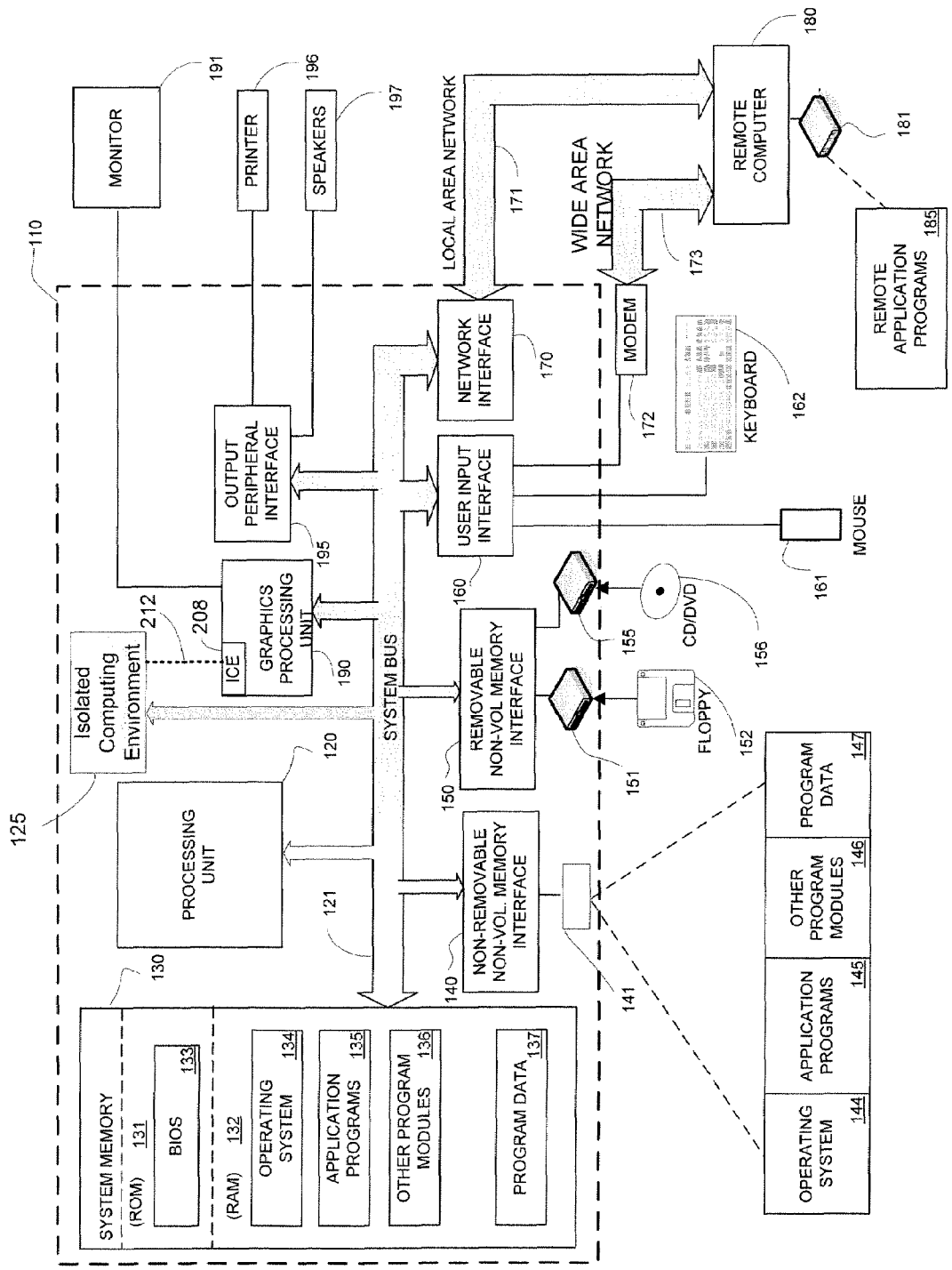
FIG. 2 is a simplified and representative block diagram of a computer.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The isolated computing environment 125 may store and cause execution of programs and data. The isolated computing environment 125 may be deployed and configured to enforce the terms of an agreement between a user of the computer 110 and a service provider with an interest in the computer 110.

The isolated computing environment 125 may be instantiated in more than one manner. When implemented by one or more discrete components, the isolated computing environment 125 may be disposed on the motherboard of the computer. The motherboard may be any circuit interconnect and component mounting base technology suitable for a given application and may range from a fiberglass material, to molded epoxy resin, Mylar, ceramic, etc. When the isolated computing environment 125 is disposed on or in the motherboard, the isolated computing environment 125 may be coated in an epoxy or buried beneath interconnect layers or components. Coating or burying the isolated computing environment 125 may serve to increase the difficulty of removing or tampering with the isolated computing environment 125 itself, associated power and ground connections to the isolated computing environment 125 or data and address connections to the isolated computing environment 125. Ideally, the removal or de-lidding of the isolated computing environment 125 causes permanent damage to the motherboard and/or surrounding components and renders the computer 110 inoperable.

Alternately, the isolated computing environment 125 may be incorporated in the processing unit 120, providing better access to processing unit registers and data busses (not depicted). The isolated computing environment 125 may be also be hosted by a peripheral or may be emulated in software, for example, by the operating system. Furthermore, it may be as thin as conventional borders between software modules. Obviously, the ability of the isolated computing environment 125 to resist attack is limited by the strength of the hosting environment.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard-disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics processing unit 190. In addition to the monitor, computers may also include an output peripheral interface 195 for connecting other peripheral output devices such as a printer 196 and speakers 197.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

The isolated computing environment may be or may be similar to the isolated computing environment 125 introduced above. The isolated computing environment 125 may include a memory, a logic circuit and a clock or timer, for example, the timer may be used to implement a clock by counting intervals of real time. The memory may include both volatile and non-volatile memory. The isolated computing environment may further include a digital signature verification circuit. When one-way verification of an external entity is required, for example, verification of a server (not depicted), a random number generator may be a part of the digital signature verification circuit. Digital signature technology is well known and hashing, signature verification, symmetric and asymmetric algorithms and their respective keys are not discussed here in detail. A detailed description of an isolated computing environment is given in U.S. patent application Ser. No. 11/022,493, which is hereby incorporated by reference. From a security point of view, an ideal isolated computing environment provides a computation environment that can be accessed only via well defined interfaces provided by the hosted application or logic. Particularly, any other party, including adversaries, can interact with the isolated computing environment hosted logic only via these interfaces.

Figure 3:
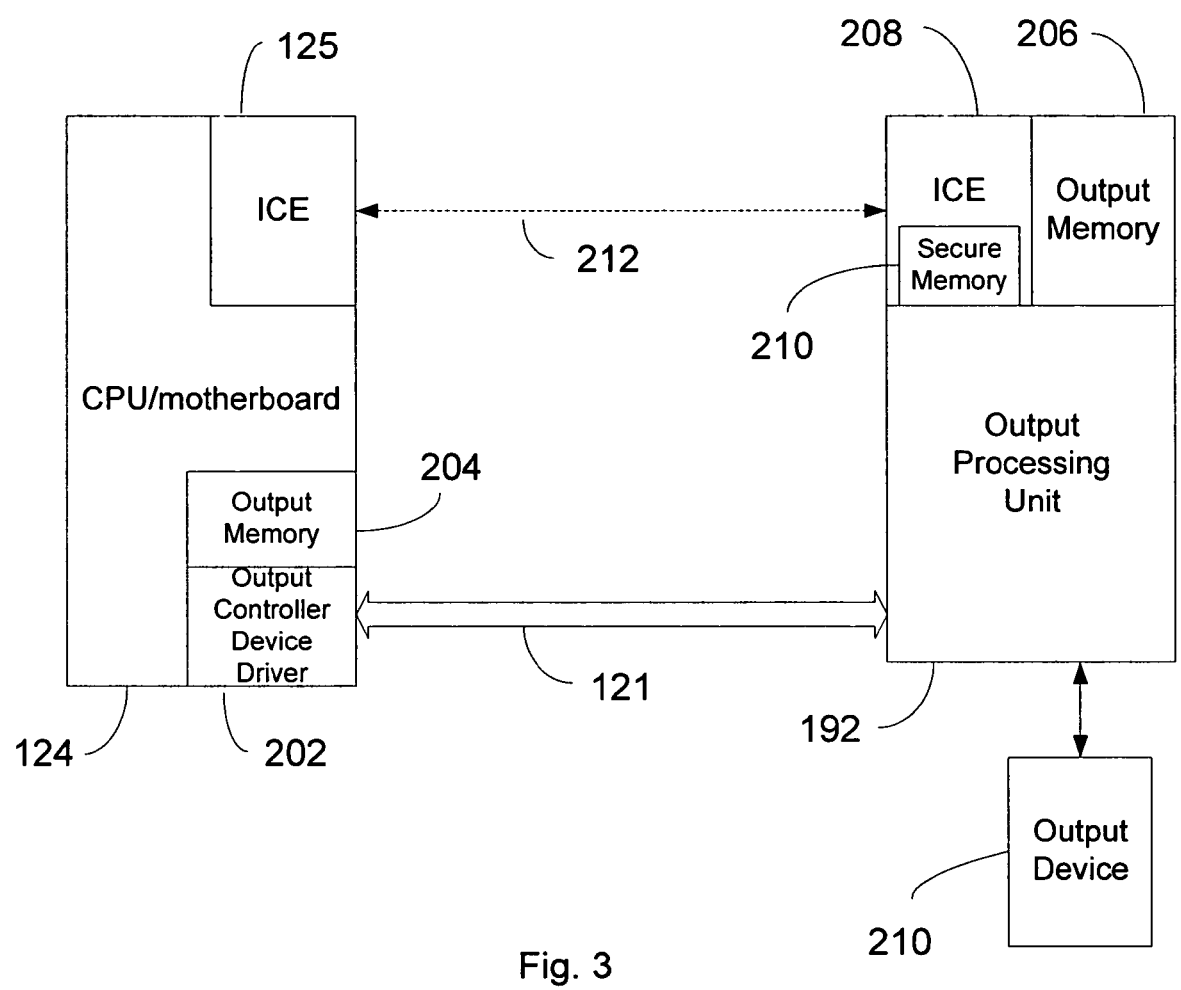
FIG. 3 is a simplified and representative block diagram showing the logical relationship between the CPU/motherboard and graphics processing unit of the computer of FIG. 2.

FIG. 3 shows an exemplary embodiment of the computer 110 showing the logical relationship between an output controller 192 and the other functional components of the computer 110 hereinafter referred to as the CPU/motherboard 124. The output controller 192 may be a graphics processing unit 190, an output peripheral interface 195, or other interface device. A representative output device 210 may be any corresponding device, such as a display/monitor, a speaker, a printer, etc. Of particular interest on the CPU/motherboard 124 are the processing unit 120, the isolated computing environment 125, the system memory 130, and the network interface 170.

The CPU/motherboard 124 may include the isolated computing environment 125 and memory holding an output controller device driver 202 and output memory 204. When the output controller 192 is a graphics processing unit 190, the output memory 204 may be an image memory buffer. The output controller device driver 202 may be software routines that adapt general display instructions from an active program to the particular format and protocol expected by the particular output controller 192 installed. Different brands and models of output controller 192 may require different protocols and data formats. Therefore, the output controller device driver 202 may be different for each brand/model of output controller. The output memory 204 is a convenient depiction of program data 137 such as display graphics, particularly static images that may be associated with any number of application and utility programs 134, 135, 136, but may also include generated graphic images.

The output controller 192 depicted in FIG. 3 may include output memory 206, in the case of a graphics processing unit, the memory may be a dual port memory capable of being written by the graphics processing unit processor (not depicted) while being read by an output circuit (not depicted). The output controller 192 may include an isolated computing environment 208 supported by and contained in the output controller 192, as will be described below in greater detail. The isolated computing environment 208 may include a secure memory 210 to provide trustworthy storage for, among other things, keys, certificates, and hash codes.

As described above, there may be two isolated computing environments. A first that controls the state and usage measurement and a second that supports the first with respect to the output channel and that may be hosted in the output controller 192. In some cases the two instances of the isolated computing environment may be physically hosted by the same hardware.

The output controller 192 may be coupled to the CPU/motherboard 124 by the main system bus 121 as described above. Logically, the isolated computing environment 125 of the CPU/motherboard 124 may be coupled to the isolated computing environment 208 of the output controller 192 by means of a secure channel 212 over the system bus 121. The use of a secure channel 212 may allow the two isolated computing environments 125 208 to authenticate each other and then communicate using, in one embodiment, session keys generated by a Diffie-Hellman key exchange, known in the art. The use of session keys allows high speed communication of encrypted data between mutually authenticated end points, e.g. the isolated computing environments 125 208. The application of secure channel communication is discussed in more detail below.

In operation, the isolated computing environment 125 may be used to determine when the computer is running in a full operation mode or a sanctioned mode. As discussed in the above-referenced United States patent application, value may be stored in the isolated computing environment 125 and incrementally consumed as the computer is used. In one alternative embodiment, the isolated computing environment may monitor use over a specific period of time, for example, a calendar month. When the value or time period is consumed, the isolated computing environment 125 may signal the processing unit 120 to limit the functionality of the computer. This may include slowing the processing speed, limiting the amount of memory that can be accessed, etc. The isolated computing environment 125 may also intervene to disable networking capability. The isolated computing environment 125 in conjunction with the processing unit 120 may allow only certain authorized programs to execute. Some of these options may have undesirable side effects, for example, slowing the processor may cause timing issues in memory access and peripheral interfaces or disabling networking capability may limit a user's ability to recharge or re-enable the computer 110.

Another alternative for imposing sanctions is for the isolated computing environment 125 of the CPU/motherboard 124 to establish communication with the isolated computing environment 208 of the graphics processing unit 190. The isolated computing environment 125, after authentication steps, may indicate to the isolated computing environment 208 that the computer 110 is operating in a sanctioned mode. The isolated computing environment 208 may then intervene in the normal operation of output controller 192, for example, preventing the output signal from reaching its corresponding output.

When in the sanctioned-mode operation, data in the output memory 206 may be checked before it is allowed to be output, for example, to a monitor 191. Alternatively, the data representing graphic images may be checked before it is written to the output memory 206. For example, data representing graphic images may be checked before being written to the output memory 206. When checking the output data, several methods may be employed. Overall, the data is being checked to determine whether it is associated with programs that are authorized for execution during a particular mode of operation, for example, sanctioned-mode operation or stand-by operation. Using a graphics controller 191 as an example, by displaying only graphics associated with sanctioned-mode operation, the computer 110 can be effectively limited in operation to only those applications or utilities that are predetermined to be useful for recharging or reactivating the computer 110, or for diagnostics and maintenance. Screening output graphics can avoid use of the other sanctioning measure outlined above and their various, often undesirable or unpredictable, side-effects.

To summarize, the output controller 192 may validate that the output data or media matches the execution mode. The output controller 192 may channel the output only if it is allowed for the given mode of operation of the computer 110. The output data or media may be identified using known mechanisms, for example, digital signatures. The qualification metadata may be attached to the output data or media or provided to the output controller 190 separately. The qualification metadata may be digitally signed by the computer provider or service provider.

While the major options for the output controller may be to either provide the output signal or block it, other options exist. For example, rather than blocking a graphics output, a graphics controller 191 may degenerate the output in some manner. For example, when in a restricted mode, a display may be presented in monochrome or with added noise. Similarly, a sound controller may band limit an audio signal.

When the output controller 192 is a graphics processing unit 190, special considerations may be made to accommodate possible interactions of a user with a displayed image. To allow for localization of text and prompts, and to allow for input characters, the area of the displayed image that is verified, as by a signature of hash, may have well defined exclusion areas or "cut-outs." The use of cut-outs allows a portion of a displayed graphic to have a level of variability required for useful interaction and still allow authentication with respect o the non-cut-out areas. To accomplish this, signed or authenticated metadata associated with the displayed image is used to define the ranges of memory over which the authentication of the displayed image is to take place. By essentially specifying pixel ranges of images, areas reserved for inputs or other non-fixed data may be accommodated with preserving the benefits of qualifying output signals. The qualification of output signals is discussed in more detail below.

Further to the case of the graphics processing unit 190, several specific cases may be taken into account. In order to mitigate an attack that simply replaces the graphics processing unit 190, the graphics processing unit 190 may be "anchored" to the computer 110, that is, cryptographically tied to the processing unit 120 or isolated computing environment 125 of the motherboard 124 (see related application Ser. No. 11/039,165, herein incorporated by reference for all purposes). Another method for mitigating a "replacement" attack is to encrypt all or a portion of output graphics. Thus, an attack using a replacement processing unit that is not capable of decryption or with the wrong keys will not respond to output graphics signals.

Another way to mitigate an attacking by-pass output controller 192, is by having the computer ICE 125 authenticate and enumerate all the devices during boot. This includes key exchanges, etc. As a result, an attacking replacement output controller 192 will fail authentication and therefore be unable to decrypt the signal and data sent to the output controller 192. Furthermore, this model may be attacked by eliminating or corrupting the communications between the computer 110 and the isolated computing environment 208 of the output controller 192. These attacks may be mitigated by employing a form of heart-beat scheme, and encrypting and/or digitally signing the communications (using keys exchanged between the two isolated computing environments 125 208 during manufacturing and/or boot). If the isolated computing environment 208 of the output controller 192 suspects that the communication is attacked, it can apply stringent restrictions inline with the above. Similarly the computer isolated computing environment 125 can restrict, sanction or stop the computer all together.

Another area for consideration with output graphics are the window border areas of authorized graphics. In order to mitigate attacks that expand or otherwise use the window borders, the graphics processing unit 190 may be programmed with fixed window borders for use in the sanctioned mode. Expanding the flexibility of this model, the graphics controller 191 may be programmed to allow for sufficiently thin and dull borders, e.g. having a consistent width, for example, not wider than 3 pixels, and having a consistent color. Thus defined, an attacker can gain very limited functionality using the borders.

Figure 4:
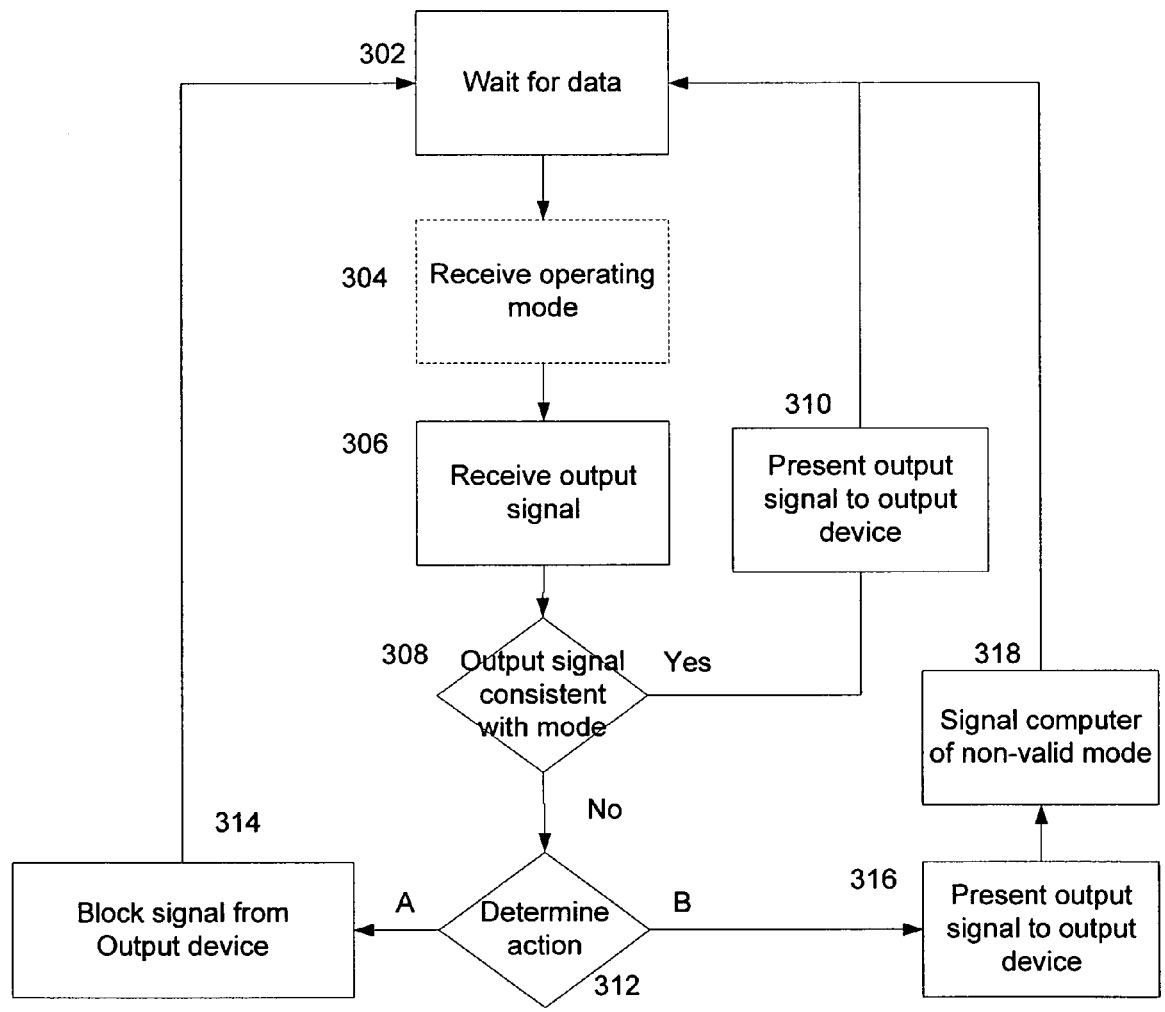
FIG. 4 is a flow chart depicting a method of operating a pay-per-use or pay-as-you go computer.

Referring to FIG. 4, a method for operating a computer is discussed and described. An operating mode of the computer 110 may involve several alternatives already discussed, for example, a full function mode or a sanctioned mode. When in the full function mode, the computer 110 may provide access to all services and utilities normally made available to the user, while a restricted set available when in the sanctioned mode. Alternately, the computer 110 may be in an operating state or a standby state. The computer 110 may be metered in the operating state, for example, consuming usage against a prepaid time limit, whereas in the standby state metering may be suspended. Whether the computer 110 is metered in the sanctioned mode is a business decision. In any case, whether determining full/sanctioned mode or operating/standby mode, a scheme provider, for example, an Internet service provider, may have a direct interest in both the accuracy of the measurement and the actions taken as a result of the measurement.

As shown in FIG. 4, an output controller 192 may wait 302 for data from a device driver 202. The output controller 192 may receive 304 a signal indicating the current operating mode of the computer, for example, full/sanctioned operation or operating/standby. When The isolated computing environment 125 of the CPU/motherboard 124 may establish a secure communication channel 212 with the isolated computing environment 208 of the output controller. Using the secure communication channel 212, the isolated computing environment 125 may communicate both mode information and, when necessary, updated signature or hash information. The isolated computing environment 208 may not have direct access to an outside host, so the isolated computing environment 125 may be the primary mode for updates related to hashes, certificates, new/updated allowable output signals and new/updated modes of operation. Data may be provided by any trusted source, for example, output controller firmware updates may not come from the service provider, but from the manufacturer. When no signal indicating a new mode is received 304, operation continues using the current mode. The output device 190 may receive 306 an output signal including data intended for an output. The intended output may be user-oriented, such as visual, audio or haptic. The data may also be intended for non-user outputs such as a printer or facsimile machine. Using the last setting from block 304, the output controller 192 may determine when the output signal is consistent with the operating mode of the computer 110.

To determine consistency with the operating mode, the output controller 192 may verify a digital signature of the output signal prior to outputting the signal to the appropriate output device. The output signal may include not only the data that is ultimately output but may also include indicia that indicated the nature of the output signal and the output signal's compatible modes. For example, the output signal maybe a payment screen and may also contain indicia related to "cut-outs," and that the output signal is compatible with sanctioned-mode operation. The output signal, including indicia, may be digitally signed. Verifying digital signatures is known in the art, but briefly, a hash of the appropriate portions of the output signal may be encrypted using a secret key owned by a known, trusted authority. The isolated computing environment 208 may then decrypt the hash using its own key and compare it with a hash calculated by the isolated computing environment 208. The keys may be derived symmetric keys or may be public key technology key-pairs, both known in the art.

A similar alternative for determining when an output signal is consistent with the operating mode uses a hash verification of the output signal. In this embodiment, hashes of known output signals are preloaded in the secure memory 210 of the isolated computing environment 208. When the output signal is received 306 the isolated computing environment 208 calculates a hash of the output signal over what ever range of data is specified. The range information may accompany the hash or the output signal, since the result (the resulting hash) is known. When the hash calculated by the isolated computing environment 208 matches the pre-stored hash, the output signal compatibility with the current mode can be determined using a look up table or similar scheme.

Both signed data and hash matching result in verified output signals that may be matched for consistency with the current operating mode. Validated output signals may be matched to a corresponding mode, for example, restricted or standby. Non-validated output signals are not likely to be allowed in a sanctioned mode. Therefore, non-validated output signals may be blocked from presentation to the output device. Alternatively, a substitute signal may be presented to the output device, for example, a message indicated that the original output was blocked and suggested next steps. In yet another alternative, a degenerated form of the output signal may be presented to the output device. When the computer 110 is in a standby mode, i.e. non-metered, and an output signal is received that cannot be validated, the non-validated output signal may be presented to the appropriate output device. Additionally, a signal may be sent from the isolated computing environment 208 to the isolated computing environment 125 indicating a non-validated output was presented. The isolated computing environment 125 may then evaluate whether to return to an operating mode and restart metering.

It may be difficult computationally to identify a window that potentially qualifies as complying with the execution mode. One option is brute force, that is, the graphics controller 190 may employ some heuristics to locate a prospected window beginning and from there perform the measurement process.

A far more efficient model is to have the operating system 134 provide a hint to the graphics controller 190 as to the location of the windows/frames/widgets that are supposed to qualify with the execution mode. As long at the graphics controller 190 uses this information as a hint, but does not use it in place of verification, the security model is maintained. This hint allows the graphics controller 190 to focus on areas of potential interest. This model depends on the reasonable assumption that the graphics controller 190 is suspicious and allows only qualified windows/frames/widgets to make it to the screen. Similarly, if a metering decision is concluded, that is, only if the graphics processor 190 is certain that all the info displayed doesn't require metering then it signals the computer 110 or a metering circuit (not depicted) not to meter.

The user experience may be refined by allowing in sanctioned mode the background to remain. That is, the graphics controller 190 will not accept new non-qualifying windows/frames/widgets, but will allow what was displayed just before turning into sanctioned mode.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of enforcing a sanctioned mode of a pay-per-use computer having a first isolated computing environment that enforces terms of a pay-per-use agreement and a second isolated computing environment in an output controller that is communicatively coupled to the first isolated computing environment, the method comprising:

operating the computer in an operating mode with metering active;

determining at the first isolated computing environment that a sanctioned operating mode is required and suspending metering;

establishing a secure channel between the first isolated communication environment and the second isolated communications environment;

examining a signal presented for output via the output controller at the second isolated computing environment to determine if the signals contain data matching approved output for presentation during the sanctioned operating mode;

outputting the signal when it contains data matching approved output for presentation during the sanctioned operating mode; and sending a message to the first isolated computing environment when the signal is free of data consistent with presentation during the sanctioned operating mode;

evaluating at the first isolated computing environment, responsive to the message, whether the computer should be returned to the operating mode.

2. The method of claim 1, further comprising:

blocking output of the signal when the signal is free of data consistent with presentation during the sanctioned operating mode.

\* \* \* \* \*